US009931990B2

(12) United States Patent
Wang et al.

(10) Patent No.: US 9,931,990 B2
(45) Date of Patent: Apr. 3, 2018

(54) STORAGE ASSEMBLY AND VEHICLE CONSOLE EMPLOYING THE SAME

(71) Applicant: Ford Global Technologies, LLC, Dearborn, MI (US)

(72) Inventors: Tony Wang, Nanjing (CN); Hallie Ge, Nanjing (CN); Christina Fu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/376,187

(22) Filed: Dec. 12, 2016

(65) Prior Publication Data

US 2017/0174142 A1  Jun. 22, 2017

(30) Foreign Application Priority Data

Dec. 21, 2015 (CN) .......................... 2015 1 0965374

(51) Int. Cl.
  *B60R 7/04* (2006.01)
  *B60N 3/10* (2006.01)
(52) U.S. Cl.
  CPC . *B60R 7/04* (2013.01); *B60N 3/10* (2013.01)
(58) Field of Classification Search
  CPC ........... B60N 3/10; B60N 3/105–3/108; B60R 2011/0007; B60R 7/04; B65D 21/08; A47G 23/0216
  See application file for complete search history.

(56) References Cited

U.S. PATENT DOCUMENTS

| 7,694,928 | B2 * | 4/2010 | Lee ........................ | B60N 3/101 224/281 |
| 7,757,888 | B2 * | 7/2010 | Ogura .................... | B60N 3/106 220/345.1 |
| 2006/0278790 | A1 * | 12/2006 | Park ........................ | B60N 3/10 248/311.2 |
| 2011/0127308 | A1 * | 6/2011 | Ogura .................... | B60N 3/106 224/545 |
| 2014/0367433 | A1 | 12/2014 | Rifel et al. | |
| 2015/0115650 | A1 | 4/2015 | Zhang et al. | |
| 2015/0201780 | A1 * | 7/2015 | Yokota ................... | B65D 21/08 220/720 |
| 2017/0174142 | A1 * | 6/2017 | Wang ....................... | B60R 7/04 |

FOREIGN PATENT DOCUMENTS

| CN | 102951058 | 3/2013 |
| DE | 202011051988 | 11/2011 |
| KR | 20050031813 | 4/2005 |
| KR | 20100060287 | 6/2010 |

* cited by examiner

*Primary Examiner* — Gregory A Blankenship
(74) *Attorney, Agent, or Firm* — Mohr IP Law, PC

(57) ABSTRACT

A storage assembly is provided to include a housing; a floor supported on the housing; an arm supported on the floor and elastically retractable between a retracted position and an extended position along a first direction; a drive member supported on the housing and including a cavity with an opening to receive a portion of the arm in the extended position; and a resistance member supported on the housing and including a shoulder at least partially retractably extendable through the opening to support the arm.

20 Claims, 4 Drawing Sheets

STORAGE ASSEMBLY AND VEHICLE CONSOLE EMPLOYING THE SAME

RELATED APPLICATION

This application claims the benefit of Chinese Patent Application No.: CN 201510965374.1, filed on Dec. 21, 2015, the entire contents thereof being incorporated herein by reference.

TECHNICAL FIELD

The present disclosure relates to a storage assembly and a vehicle console employing the same.

BACKGROUND

Automotive interiors often feature a number of storage compartments, such as a cup holder positioned at a central console or a rear seat armrest. U.S. Patent Publication US 2015/0201780 A1 discloses a cup holder including a height adjustable member. The height adjustable member may move along a height direction to position cups with various heights.

SUMMARY

According to one or more embodiments, a storage assembly is provided. The storage assembly includes a floor supported on the housing; an arm supported on the floor and elastically retractable between a retracted position and an extended position along a first direction; a drive member supported on the housing and including a cavity with an opening to receive a portion of the arm in the extended position; and a resistance member supported on the housing and including a shoulder at least partially retractably extendable through the opening to support the arm.

In one embodiment, the cavity may be defined by an upper guiding surface and a lower guiding surface extending in directions at an angle to each other, the lower guiding surface being positioned between the upper guiding surface and the floor along a depth direction, and the opening is formed on the lower guiding surface.

According to another aspect, a storage assembly is provided. The storage assembly includes a sidewall and a floor together defining a chamber with a center and an arm connected to the floor and including a hand. The sidewall includes a drive member with a first cavity and a platform positioned next thereto. The first cavity protrudes away from the center along a width direction. The floor is at a first depth position when the hand contacts the first cavity while being at a first width position, and the floor is at a second depth position when the hand contacts the platform while being at a second width position spaced apart from the first width position along the width direction.

In another embodiment, the drive member may further include a second cavity spaced apart from the first cavity along a depth direction. The platform is positioned between the first and second cavities, and the floor may be at a third depth position when the hand contacts the second cavity while being at a third width position spaced apart from the second width position along the width direction.

In another embodiment, the sidewall may further include a resistance member. At least a portion of the drive member is positioned between the center of the housing and the resistance member along the width direction.

In another embodiment, the resistance member may be movable along the width direction.

In another embodiment, the storage assembly may further include a side energizer to contact the resistance member such that the resistance member is energized against moving away from the center of the chamber.

In another embodiment, the side energizer may include a leaf spring.

In another embodiment, the resistance member may further include a first shoulder protruding toward the center of the chamber along the width direction, and the first shoulder may at least partially retractably extend through the opening of the first cavity to support the hand.

In another embodiment, the drive member may include a drive block with a drive surface extending in a direction at an angle to the width direction, and the resistance member may include a resistance block with a resistance surface to operably contact the drive surface.

In another embodiment, the drive member may include at least two drive blocks to sandwich there-between the first cavity along the depth direction, and the resistance member may include at least two corresponding resistance blocks.

In another embodiment, the arm may include a body positioned next to the hand along the width direction, and the hand may be smaller in cross-sectional dimension than the body.

In another embodiment, the storage assembly may further include an arm energizer connected to the arm along the width direction such that the arm is energized against moving toward the center of the chamber.

In another embodiment, the storage assembly may further include a floor energizer connected to the floor such that the floor is energized to move along the depth direction.

In another embodiment, the first cavity may be defined by an upper guiding surface extending in a direction at an angle to the width direction and a lower guiding surface positioned between the upper guiding surface and the floor along the depth direction.

In another embodiment, the lower guiding surface may be more parallel to the width direction than the upper guiding surface.

According to yet another aspect, a vehicle console is provided. The vehicle console includes a sidewall and a floor together defining a chamber with a center, a resistance member coupled to the sidewall, a drive member positioned between the resistance member and the center of the chamber along a width direction, and an arm connected to the floor and including a hand. The drive member includes a first cavity and a second cavity spaced apart along a depth direction and a platform positioned between the first and second cavities. The first and second cavities protrude away from the center along a width direction. The drive member further includes a drive block with a resistance surface extending in a direction at an angle to the width direction and the resistance member includes a resistance block with a driven surface to operably contact the drive surface. The first cavity is defined by a first upper guiding surface and a first lower guiding surface forming an angle between 0 degree and 90 degrees with the first upper guiding surface. The first lower guiding surface of the first cavity is positioned between the upper guiding face and the floor along the depth direction. The second cavity is defined by a second upper guiding surface and a second lower guiding surface forming an angle between 0 degree and 90 degrees with the second upper guiding surface. The floor is at a first depth position when the hand contacts the first cavity while being at a first width position, the floor is at a second depth position when the hand contacts the platform while being at a second width position spaced apart from the first width position along the width direction, and the floor is at a third depth position when the hand contacts the second cavity while being at a third width position spaced apart from the second width position along the width direction.

In one embodiment, the resistance member further includes a first shoulder protruding toward the center of the chamber along the width direction, and the first shoulder is at least partially retractably extendable through an opening formed on the first lower guiding surface of the first cavity to support the hand.

In another embodiment, the resistance member further includes a second shoulder protruding toward the center of the chamber along the width direction, and the second shoulder is spaced apart from the first shoulder and at least partially retractably extendable through an opening formed on the second lower guiding surface of the second cavity to support the hand.

In another embodiment, the first lower guiding surface has a smaller angle to the width direction than an angle of the first upper guiding surface to the width direction, and the second lower guiding surface has a smaller angle than an angle to the width direction than the second upper guiding surface.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

Figure 1:
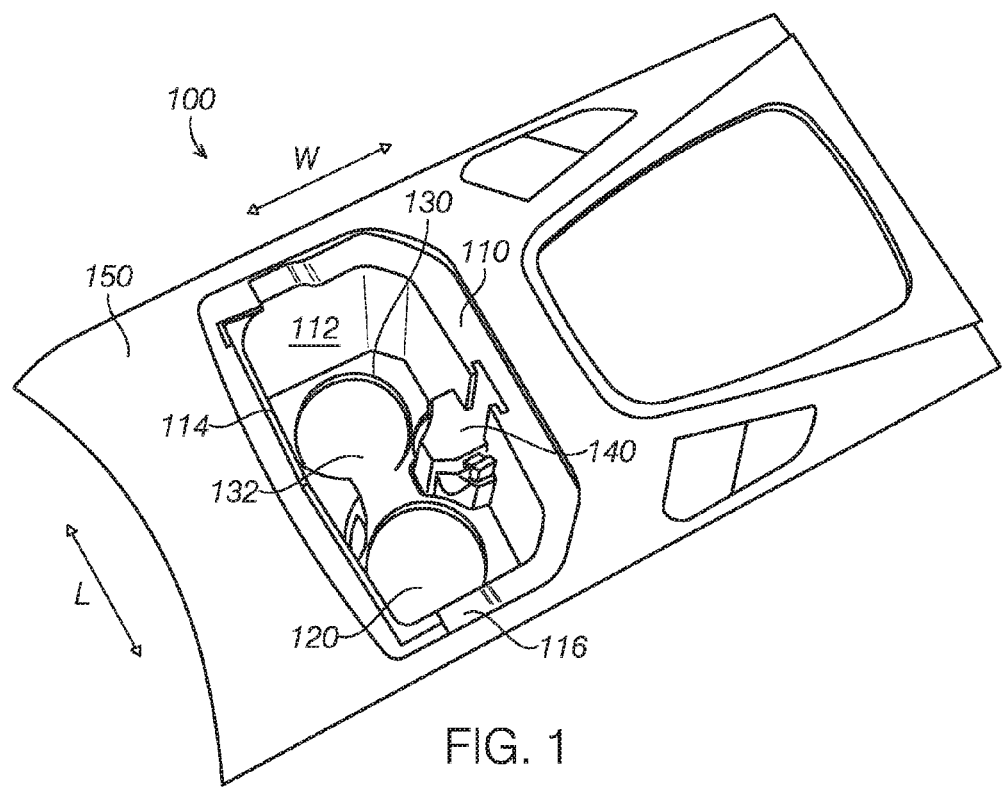
FIG. 1 illustratively depicts a top-down view of a storage assembly according to one or more embodiments of the present disclosure.

As referenced in the figures, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

The present invention in one or more embodiments is believed to be advantageous in at least reflecting the understanding that it is helpful to provide a storage assembly suitable for articles with various heights and coupled with enhanced ease of operation, particularly where the height adjustment is operable even when the article is already in position.

As detailed herein elsewhere, the present invention in one or more embodiments is believed to be advantageous in providing a storage assembly where various articles with different heights may be accommodated, and efficient use of the vehicle interior space may be realized. The storage assembly is particularly advantageous in that a floor is provided to support the article in various positions spaced apart along the depth direction such that the article with various heights may be positioned accordingly, thus providing enhanced ease of access.

Figure 2:
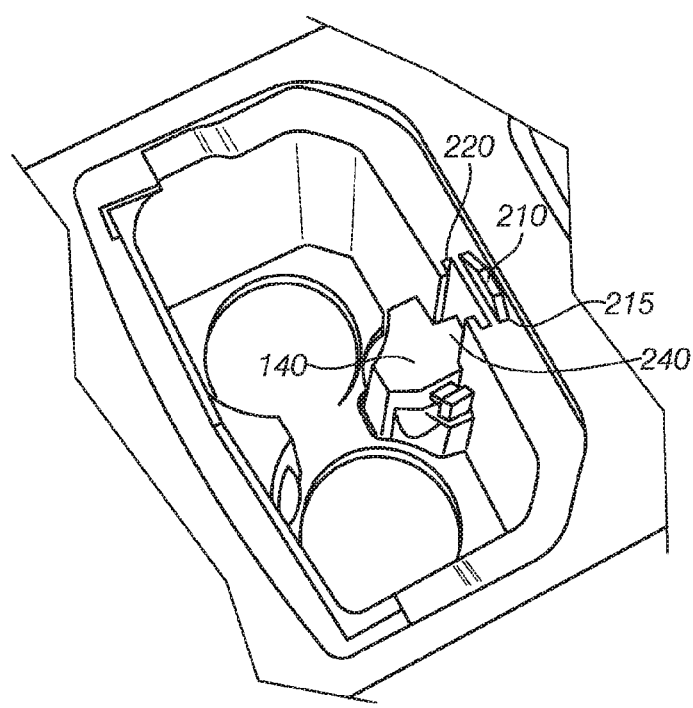
FIG. 2 illustratively depicts a partial enlarged view of the storage assembly as referenced in FIG. 1.
Figure 3:
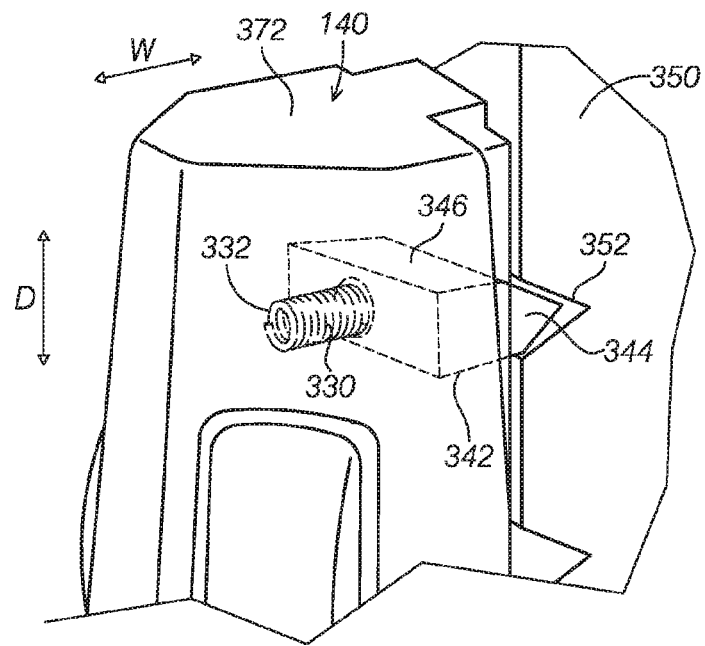
FIG. 3 illustratively depicts another partial enlarged view of the storage assembly as referenced in FIG. 1.

FIG. 1 through FIG. 7 illustratively depict various views of a storage assembly 100 according to one or more embodiments of the present disclosure. As shown in FIG. 1, the storage assembly 100 includes a sidewall 110 and a floor 120 together defining a chamber 130 with a center 132. With reference to FIG. 3 and FIG. 4A-4B, the sidewall 110 includes a drive member 350 with a first cavity 352 and a platform 354 positioned next to the first cavity 352. The first cavity 352 protrudes away from the center 132 along a width direction W. In other words, the first cavity 352 faces the center 132. The storage assembly 100 further includes an arm 342 connected to the floor 120 and including a hand 344. The floor 120 is at a first depth position D1 when the hand 344 contacts the first cavity 352 while being at a first width position W1, and the floor 120 is at a second depth position D2 when the hand 344 contacts the platform 354 while being at a second width position W2 spaced apart from the first width position W1 along a width direction W. The arm 342 may be elastically retractable between a retracted position W2 and an extended position W1 along a first direction such as the width direction W.

For illustration purposes, the storage assembly 100 is depicted as a cup holder positioned at a vehicle floor console in the description and drawings. However, the storage assembly 100 may be employed at other locations of the vehicle, including but not limited to, the rear seat armrest, the control panel, and vehicle seats. In addition, the storage assembly 100 may be utilized elsewhere other than a vehicle, with non-limiting examples thereof including a water vessel, an airplane, a home or a commercial seat.

The center 132 may be any point or any area located within the chamber 130 and being spaced apart from one or more side walls 110, 112, 114 and 116 that together define the chamber 130. In some embodiments, and particularly where the chamber 130 is in general defined with four sides as illustratively depicted in FIG. 1, the center 132 may be located about halfway between the sidewall 110 and its opposing sidewall 114 along the width direction W, and/or about halfway between the sidewall 112 and its opposing sidewall 116 along a longitudinal direction L. The term "about" refers to a measurement with up to 10 percent (%), 20%, 30% or 40% allowance in variation relative to a true value of the measurement.

Referring to FIG. 1 and FIG. 2, the chamber 130 may be positioned in relation to a housing 150, which in turn may be configured as a portion of the armrest console. Accordingly, also the sidewall 110 which defines the chamber 130 may be part of and/or supported on the housing 150. As detailed herein elsewhere, the floor 120 may be connected to the housing 150 via a floor energizer 450, such that the floor 120 may move along a depth direction D as relative to the sidewall 110 or housing 150 in order to accommodate articles with various heights. As illustratively depicted in FIG. 4B and FIG. 6, a non-limiting example of the floor energizer 450 may be a spring. For brevity, the floor 120 is shown as a floor panel in the drawings. In other embodiments, the floor 120 may be of any suitable shapes and/or forms, for instance to include a side portion (not shown) extending upwardly along the depth direction D from a bottom portion, as long as the floor 120 works and functions as a support for the article to be stored against gravity.

Referring to FIG. 3, the arm 342 may be connected to an arm energizer 330 along the width direction W at one end. A non-limiting example of the arm energizer 330 may be a spring. Accordingly, due to the arm energizer 330, the arm 342 may be forced along the width direction W against moving toward the center 132 of the chamber 130, while enabling the arm 342 to be elastically retractable between the retracted position W2 and the extended position W1 along the width direction W, as illustratively depicted in FIG. 4. The other end 332 of the arm energizer 330 may be connected to other suitable locations of the floor 120 or the housing 150.

For instance, and further in view of FIG. 2, a bridge portion 140 may be employed to connect the floor 120 and the sidewall 110 such that a movement of the bridge portion 140 along the depth direction D may cause the floor 120 to move accordingly. In a non-limiting manner, the sidewall 110 may include a longitudinal recess 220 to receive at least a portion 240 of the bridge 140 which may in turn be connected to the floor 120. Accordingly, the floor 120 may move with the bridge portion 140 along the depth direction D relative to the sidewall 110 and further relative to the housing 150. It is to be appreciated that the bridge portion 140 may not be employed and accordingly a main portion of the floor 120 may be directly adjacent to the side wall 110.

Referring again to FIG. 3, the other end 332 of the arm energizer 330 may be connected to and/or directly contact the bridge portion 140. In this design, the bridge portion 140 may be configured to be at least partially hollow so as to include a bridge cavity 372 within which at least a portion of the arm 342 may be received. Accordingly, not only the arm 342 may be protected against unnecessary contact and unwanted dust accumulation, but also access may be readily available when time comes for maintenance and replacement of the arm 342 or the arm energizer 330 as the latter two components are expected to endure frequent uses and operational fatigue.

The drive member 350 may be an integral part of the sidewall 110; and alternatively, the drive member 350 may be at least partially foreign to other parts of the sidewall 110 such as a resistance member 460 thereof, so that the drive member 350 may differ in construction or material from the other parts of the sidewall 110. In particular, the drive member 350 may be a pre-formed component that may be installed thereafter as a part of the sidewall 110 to provide enhanced flexibility in design and installation.

The arm 342 may contact the drive member 350 at various positions via the hand 344. For instance, with further reference to FIG. 3, FIG. 4A and FIG. 4B, the drive member 350 may include a second cavity 454 spaced apart from the first cavity 352 in the depth direction D. The platform 354 is positioned between the first cavity 352 and the second cavity 454. The floor 120 may be at a third depth position D3 when the hand 344 contacts the second cavity 454 while being at a third width position W3 spaced apart from the second width position W2 along the width direction W. It is to be appreciated that two cavities are provided herein for purpose of illustration, and in other embodiments more cavities may be provided as needed, such that three, four, or even more cavities spaced apart along the depth direction D, or alternatively only one cavity may be employed.

In some embodiments, the arm 342 may include a body 346 positioned next to the hand 344 along the width direction W. As described herein elsewhere, the body 346 may be connected to the floor 120 or in particular to the bridge portion 140 via the arm energizer 330. The body 346 may be greater in cross-sectional dimension than the hand 344, providing benefit in structural strength. Also, the hand 344 with a relatively smaller size is easy to be positioned and received within the first and second cavities 352, 454.

Figure 4A:
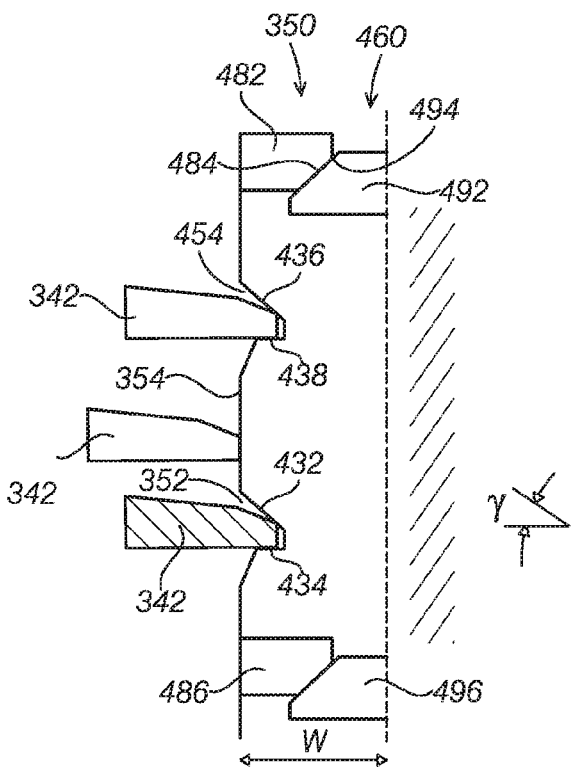
FIG. 4A illustratively depicts a partial cross-sectional view of the storage assembly as referenced in FIG. 1.
Figure 7:
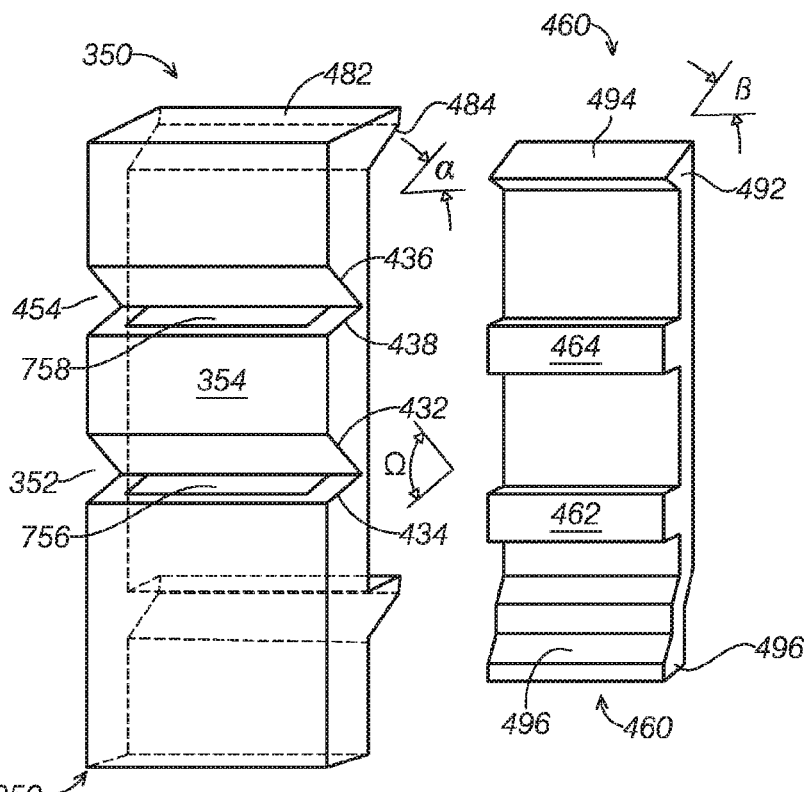
FIG. 7 illustratively depicts an exploded view of a drive member and a resistance member of the storage assembly as referenced in FIG. 4B.

With further reference to FIG. 4A and FIG. 7, the drive member 350 may include a drive block 482 which in turn includes a drive surface 484. The drive surface 484 may extend in a direction at an angle $\alpha$ to the width direction W. Correspondingly, the resistance member 460 may include a resistance block 492 including a resistance surface 494. The resistance surface 494 may extend in a direction at an angle $\beta$ to the width direction W. Angles $\alpha$ and $\beta$ may be of any suitable values as long as they each are of a value such that the resistance surface 494 is to operably contact the drive surface 484 when the drive member 350 engages the resistance member 460. Non-limiting example value ranges of angles $\alpha$ and $\beta$ include ranges of greater than zero and smaller than 90 degrees, and in particular greater than 30 and smaller than 60 degrees. With this structure, when the drive member 350 is driven downwardly, the drive block 482 may exert a force with a component of which exerted along the width direction W on the resistance block 492. With the counterforce exerted back from the resistance block 492, the drive member 350 may move toward the center 132 of the chamber 130 along the width direction W. Also, as described herein elsewhere, an upper guiding surface 432 of the first cavity 352 may exert a force on the hand 342, with a component of the force exerted along the width direction W toward the center 132 of the chamber 130, thereby forcing the hand 344 to disengage the first cavity 352 and move along the platform 354 to arrive at the second width position W2.

In the embodiment illustratively depicted in FIG. 4A, the resistance member 460 is more stationary than the drive member 350. For instance, the resistance member 460 may be formed as an integral part of the sidewall 110 so as to provide the stationary resistance against the movement of the drive member 350 via the resistance block 492.

Figure 5:
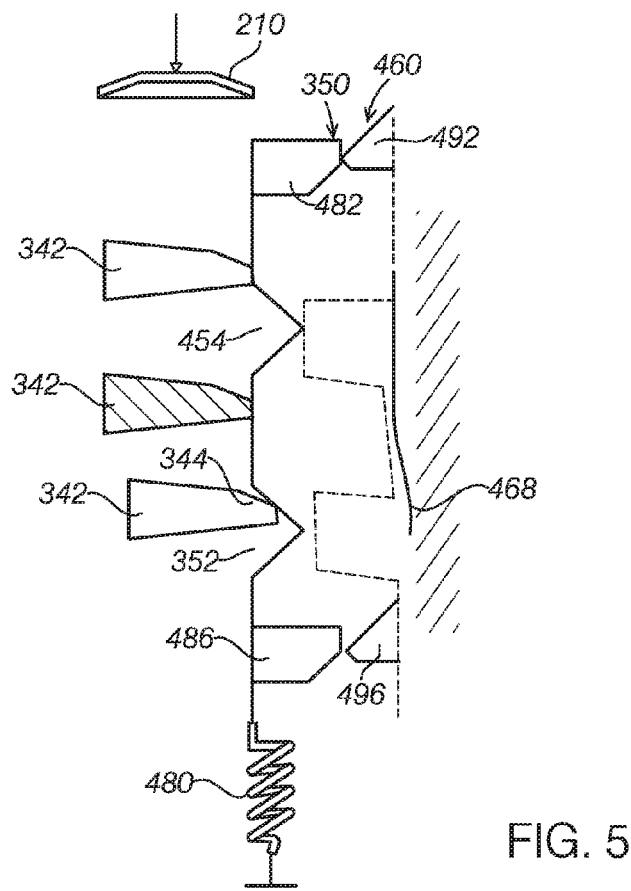
FIG. 5 illustratively depicts yet another partial cross-sectional view of the storage assembly as referenced in FIG. 4B.
Figure 6:
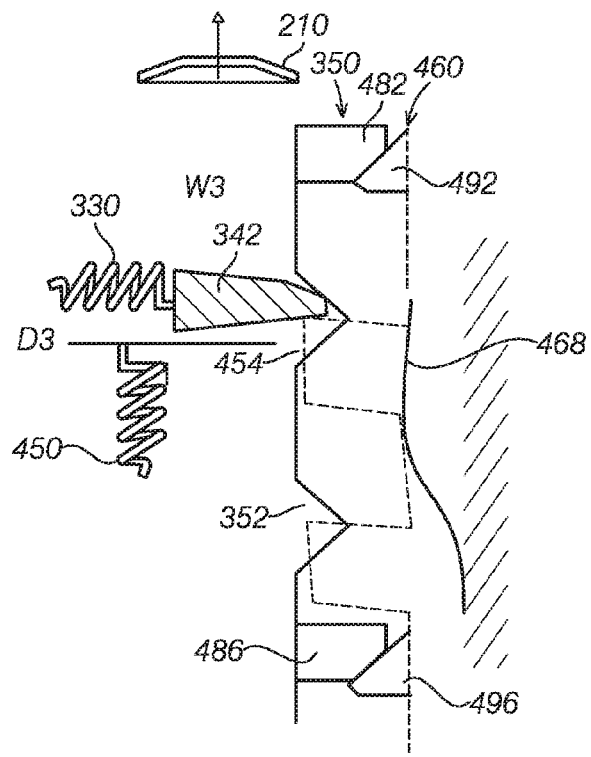
FIG. 6 illustratively depicts another partial cross-sectional view of the storage assembly as referenced in FIG. 4B.

In one or more embodiments as illustrated in FIG. 5, the drive member 350 may include two drive blocks, such as a first or upper drive block 482 and a second or lower drive block 486, to sandwich there-between the first cavity 352 along the depth direction D. Furthermore, the resistance member 460 may include two corresponding resistance blocks, such as a first or upper resistance block 492 and a second or lower resistance block 496.

Referring back to FIG. 2, FIG. 4A, FIG. 4B and FIG. 5 through FIG. 7, a hole 215 may be formed on the sidewall 110 to receive there-through a button 210. Accordingly, a push on the button 210 may cause the drive member 350 to move as described herein elsewhere. The button 210 may be a pre-formed component that is thereafter connected to the drive member 350 thereafter; or it may be formed integrally with the drive member 350.

Referring again back to FIG. 4A, the first cavity 352 may be defined by a first upper guiding surface 432 and a first lower guiding surface 434 that is more parallel to the width direction W than the first upper guiding surface 432. An angle γ forms between the first upper and first lower guiding surfaces 432, 434. In other words, as compared to the first upper guiding surface 432, the first lower guiding surface 434 may be of a comparatively smaller slope or at a comparatively smaller angle relative to the width direction W. This embodiment is believed to be particularly beneficial in positioning the hand 344 and therefore providing greater support of the article against gravity. On the other hand, as being with a comparatively greater slope relative to the width direction W, the first upper guiding surface 432 facilitates the sliding-in and sliding-out movement of the hand 344 relative to the first cavity 352 to transit from the first width direction W1 to the second width direction W2.

Like the first upper and first lower guiding surfaces 432, 434 of the first cavity 352, the second cavity 454 may be defined by a second upper guiding surfaces 436, and a second lower guiding surface 438 with similar configuration.

For illustration purpose, the first lower guiding surfaces 434 and the second lower surface 438 are shown in FIG. 4A as being generally parallel to the width direction W. In other embodiments, the first lower guiding surfaces 434 and the second lower guiding surface 438 may have an angle to the width direction W. Thus, the first cavity 352 and the second cavity 454 with the relatively flat lower guiding surface design as detailed in relation to FIG. 4A are not to substantially interfere with a reverse or return movement of the drive member 350 via which the hand 344 may return from the third width position "W3" to the first width position "W2." This is at least because the return may be easily accomplished via a push down on the floor 120 or on the article which sits on the floor 120. This push down along the depth direction "D" may readily overcome the resistance otherwise imparted by the relatively flatter bottom guiding surface such as the first lower guiding surface 434.

Figure 4B:
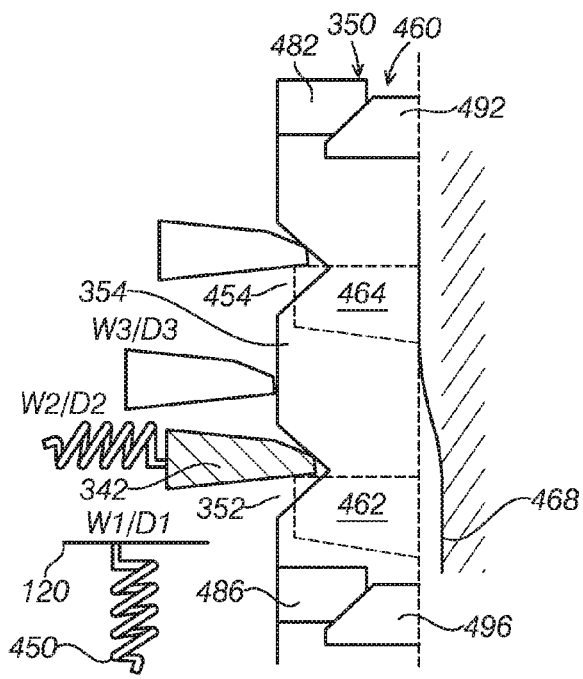
FIG. 4B illustratively depicts another partial cross-sectional view of the storage assembly as referenced in FIG. 1.

The embodiment illustratively depicted in FIG. 4B differs from the design of FIG. 4A in that the resistance member 460 of FIG. 4B includes at least one shoulder such as the first shoulder 462 and/or the second shoulder 464. As detailed herein elsewhere, and further in view of FIG. 7, the first and second shoulders 462, 464 may be respectively received through first and second openings 756, 758 positioned on the first and second cavities 352, 454, and in particular formed on the first and second lower guiding surfaces 434, 438 thereof. When received through the first and second openings 756, 758, the first and second shoulders 462, 464 are to provide positioning and hence support of the article to be stored against gravity. In addition, the resistance member 460 may be more stationary along the width direction W than the drive member 350, further in view of FIG. 5 and FIG. 6. It is to be appreciated that two shoulders and two cavities are provided herein for illustration purposes. In other embodiments, more or fewer shoulders and/or cavities may be employed as desirable.

With further reference to FIG. 4B through FIG. 7, exploded and assembly views of the drive member 350 and resistance member 460 according to one or more embodiments are illustratively depicted. The first cavity 352 formed on the drive member 350 may include the first upper guiding surface 432 and the first guiding surface 434. The first upper guiding surface 432 may extend in a direction at an angle of Ω to the first lower guiding surface 434 or to the width direction W, such that the first cavity 352 protrudes away from the center 132 of the chamber 130 or faces the center 132. The first lower guiding surface 434 may be positioned between the first upper guiding surface 432 and at least a portion of the floor 120 along the depth direction D. Accordingly, as described herein elsewhere, via contact engagement of the first upper and first lower guiding surface 432, 434 and the hand 344, operations on the drive member 350 may move the arm 342 along the width direction W, thereby enabling a one-push control of the storage assembly 100. Non-limiting example value ranges of angle Ω include ranges of greater than zero and smaller than 90 degrees, greater than 15 and smaller than 75 degrees, and greater than 30 and smaller than 60 degrees.

The resistance member 460 may further include the first shoulder 462. The first shoulder 462 may extend through the first opening 756 formed at the first lower guiding surface 434 of the first cavity 352 toward the center 132 of the chamber 130 along the width direction W. The first opening 756 may be formed as a through-aperture of the drive member 350. The first shoulder 462 may at least partially retractably extend through the first opening 756 to support the arm 342. In some embodiments, the first opening 756 may be formed on the lower guiding surface 434 of the first cavity 352. Accordingly, the first shoulder 462 may at least partially retractably extend through the first opening 756 as illustratively depicted in FIG. 7 to support the hand 344 as illustratively depicted in FIG. 4B so as to support the floor 120 at the first depth position D1, or to support the hand 344 as illustratively depicted in FIG. 6 so as to support the floor 120 at the third depth position D3.

In some embodiments, and when the resistance member 460 further includes one or more shoulders such as the first and second shoulders 462, 464, where the resistance surface 494 may operably contact the drive surface 484 when the drive member 350 engages the resistance member 460. As described herein elsewhere, and via in this design, the drive member 350 may be more stationary along the width direction W than the resistance member 460. With this structure, and when the drive member 350 is driven downwardly, the drive block 482 may exert a component of force along the width direction W on the resistance block 492, such that the resistance member 460 may move away from the center 132 of the chamber 130 along the width direction W. Accordingly, the first shoulder 462 may retract from the first opening 756 as illustratively depicted in FIG. 5 to no longer support the hand 344.

In another one or more embodiments, the first lower guiding surface 434 may be without the first opening 756 as illustratively depicted in FIG. 4A, and thus eliminating the need for the first shoulder 462. In this situation, the first lower guiding surface 434 may be shaped to directly support the hand 344 positioned at the first width position W1. For instance, the first lower guiding surface 434 may be configured to be at a comparatively small angle, if any, as relative to the width direction W as illustratively depicted in FIG. 4A. In other words, such configuration may include the second opening 758 at the second cavity 454 and the second shoulder 464, and exclude the first opening 756 at the first cavity 352 and the first shoulder 462. The number of shoulders may be different from the number of the cavities.

Furthermore, the side wall 110 may include the resistance member 460, where at least a portion of the drive member 350 may be positioned between the center 132 of the chamber 130 and the resistance member 460. The resistance member 460 may be supported on the housing 150 or the sidewall 110, and may move along the width direction W to engage at least a portion of the drive member 350 as illustratively depicted in FIG. 4B and FIG. 6, or disengage at least a portion of the drive member 350 as illustratively depicted in FIG. 5. The storage assembly 100 may further include a side energizer 468 to contact the resistance member 460 such that the resistance member 460 is energized against moving away from the center 132 of the chamber 130. As a non-limiting example and as illustratively depicted in FIG. 4B, the side energizer 468 may include a leaf spring. For instance, the leaf spring may be connected to the bottom portion or side portion of the housing 150, and contact or abut against the resistance member 460, thereby energizing the resistance member 460.

When the arm 342 is positioned at the first width position W1, the floor 120 may be positioned at the first depth position D1. Then, an article with relatively large height may be placed into the storage assembly 100. When an article with relatively small height needs to be placed into the storage assembly 100 and easy access is desirable, the button 210 may be pushed such that the drive member 350 moves relative to the resistance member 460 along the depth direction D and accordingly the floor changes its position along the depth direction. As described herein elsewhere, the drive block 482 may exert a component of force along the width direction W on the resistance block 492, such that the resistance member 460 may move away from the center 132 of the chamber 130 along the width direction W, such that the first shoulder 462 may retract from the first opening 756 as illustratively depicted in FIG. 5. Also, because the first upper guiding surface 432 of the first cavity 352 is at an angle to the width direction W, it may exert a component of force on the hand 344 toward the center 132 of the chamber 130 along the width direction to disengage the hand 344 from the first cavity 352.

Accordingly, and as illustratively depicted in FIG. 4B, the floor 120 may move upwardly along the depth direction D and contact the platform 354 through the side energizer 450 so as to reach the second depth position D2. Thereafter, the floor 120 may continue moving upwardly until after arriving at the third depth positioned D3. Once the hand 344 contacts the second cavity 454, the floor 120 may stop.

The button 210 may be released. As illustratively depicted in FIG. 4B and FIG. 5, the drive member 350 may be connected to the housing 150 via a drive member energizer 480. Via the drive member energizer 480, the drive member 350 may move upwardly along the depth direction D, such that the resistance member 460 may re-engage the drive member 350 through the side energizer 468. Accordingly, the second shoulder 464 may extend through an opening at the second cavity 454 so as to support the hand 344.

If the floor 120 needs to return to the first depth position D1 to receive an article with relatively greater height, the button 210 or the floor 120 may be pushed. As described herein elsewhere, the second shoulder 464 may disengage the opening at the second cavity 464. Accordingly, the floor 120 may move downwardly. Because the lower guiding surface 438 is at an angle to the width direction W, it may guide the hand 344 to move from the third width position W3 to the second width position W2 when the floor moves downwardly. Thus, the hand 344 may disengage the second cavity 454 and move further downwardly. The floor 120 may return to the first depth position D1. Thereafter, the button 210 may be released, and the storage assembly 100 may return to its initial position as illustratively depicted in FIG. 4B.

In one or more embodiments, the present disclosure provides a storage assembly. One skilled in the art will readily recognize from such discussion, and from the accompanying drawings and claims that various changes, modifications and variations can be made therein without departing from the true spirit and fair scope of the invention as defined by the following claims.

What is claimed is:

1. A storage assembly, comprising:
   a housing;
   a floor supported on the housing;
   an arm supported on the floor and elastically retractable between a retracted position and an extended position along a first direction;
   a drive member supported on the housing and including a cavity with an opening to receive a portion of the arm in the extended position; and
   a resistance member supported on the housing and including a shoulder at least partially retractably extendable through the opening to support the arm.

2. The storage assembly of claim 1, wherein the cavity is defined by an upper guiding surface and a lower guiding surface at an angle relative to each other, the lower guiding surface is positioned between the upper guiding face and the floor along a depth direction, and the opening is formed on the lower guiding surface.

3. A storage assembly, comprising:
   a sidewall and a floor to define a chamber with a center, wherein the sidewall including a drive member with a first cavity and a platform positioned next thereto, and the first cavity protrudes away from the center along a width direction; and
   an arm connected to the floor and including a hand,
   wherein the floor is at a first depth position when the hand contacts the first cavity while being at a first width position, and the floor is at a second depth position when the hand contacts the platform while being at a second width position spaced apart from the first width position along the width direction.

4. The storage assembly of claim 3, wherein the drive member further includes a second cavity spaced apart from the first cavity along a depth direction, and the platform is positioned between the first and second cavities, and wherein the floor is at a third depth position when the hand contacts the second cavity while being at a third width position spaced apart from the second width position along the width direction.

5. The storage assembly of claim 3, wherein the sidewall further includes a resistance member, at least a portion of the drive member is positioned between the center of the housing and the resistance member along the width direction.

6. The storage assembly of claim 5, wherein the resistance member is movable along the width direction.

7. The storage assembly of claim 5, further comprising a side energizer to contact the resistance member such that the resistance member is energized against moving away from the center of the chamber.

8. The storage assembly of claim 7, wherein the side energizer includes a leaf spring.

9. The storage assembly of claim 5, wherein the resistance member further includes a first shoulder protruding toward the center of the chamber along the width direction, and the first shoulder being at least partially retractably extendable through an opening on a lower guide surface that defines the first cavity to support the hand.

10. The storage assembly of claim 5, wherein the drive member includes a drive block with a drive surface extending in a direction at an angle to the width direction, and the resistance member includes a resistance block with a resistance surface to operably contact the drive surface.

11. The storage assembly of claim 10, wherein the drive member includes at least two drive blocks to sandwich there-between the first cavity along a depth direction, and the resistance member includes at least two corresponding resistance blocks.

12. The storage assembly of claim 3, wherein the arm includes a body positioned next to the hand along the width direction, the hand being smaller in cross-sectional dimension than the body.

13. The storage assembly of claim 3, further comprising an arm energizer connected to the arm along the width direction such that the arm is energized against moving toward the center of the chamber.

14. The storage assembly of claim 3, further comprising a floor energizer connected to the floor such that the floor is energized to move along a depth direction.

15. The storage assembly of claim 3, wherein the first cavity is defined by an upper guiding surface extending in a direction at an angle to the width direction and a lower guiding surface positioned between the upper guiding face and the floor along a depth direction.

16. The storage assembly of claim 15, wherein the lower guiding surface is more parallel to the width direction than the upper guiding surface.

17. A vehicle console, comprising:
   a sidewall and a floor together defining a chamber with a center;
   a drive member, wherein the drive member includes a first cavity and a second cavity spaced apart along a depth direction and a platform positioned between the first and second cavities, wherein the first cavity and the second cavity face the center of the chamber, wherein the first cavity is defined by a first upper guiding surface and a first lower guiding surface, and the first upper guiding surface and the first lower guiding surface forms an angle between 0 degree and 90 degrees, wherein the second cavity is defined by a second upper guiding surface and a second lower guiding surface, and the second upper guiding surface and the second lower guiding surface forms an angle between 0 degree and 90 degrees, and wherein the drive member includes a drive block with a drive surface extending in a direction at an angle to the width direction,
   a resistance member coupled to the side wall, wherein at least a portion of the drive member is positioned between the center of the chamber and the resistance member along a width direction, wherein the resistance member includes a resistance block with a resistance surface to operably contact the drive surface of the drive member; and
   an arm connected to the floor and including a hand, wherein the floor is at a first depth position when the hand contacts the first cavity while being at a first width position, the floor is at a second depth position when the hand contacts the platform while being at a second width position spaced apart from the first width position along the width direction, and the floor is at a third depth position when the hand contacts the second cavity while being at a third width position spaced apart from the second width position along the width direction.

18. The vehicle console of claim 17, wherein the resistance member further includes a first shoulder protruding toward the center of the chamber along the width direction, and the first shoulder is at least partially retractably extendable through an opening formed on the first lower guiding surface of the first cavity to support the hand.

19. The vehicle console of claim 18, wherein the resistance member further includes a second shoulder protruding toward the center of the chamber along the width direction, and the second shoulder is spaced apart from the first shoulder and at least partially retractably extendable through an opening formed on the second lower guiding surface of the second cavity to support the hand.

20. The vehicle console of claim 17, wherein the first lower guiding surface has a smaller angle to the width direction than an angle of the first upper guiding surface to the width direction, and the second lower guiding surface has a smaller angle than an angle to the width direction than the second upper guiding surface.

* * * * *